July 29, 1958
J. D. Z. PELTIER
2,845,035
SWING SWITCH
Filed Jan. 11, 1956
2 Sheets-Sheet 1
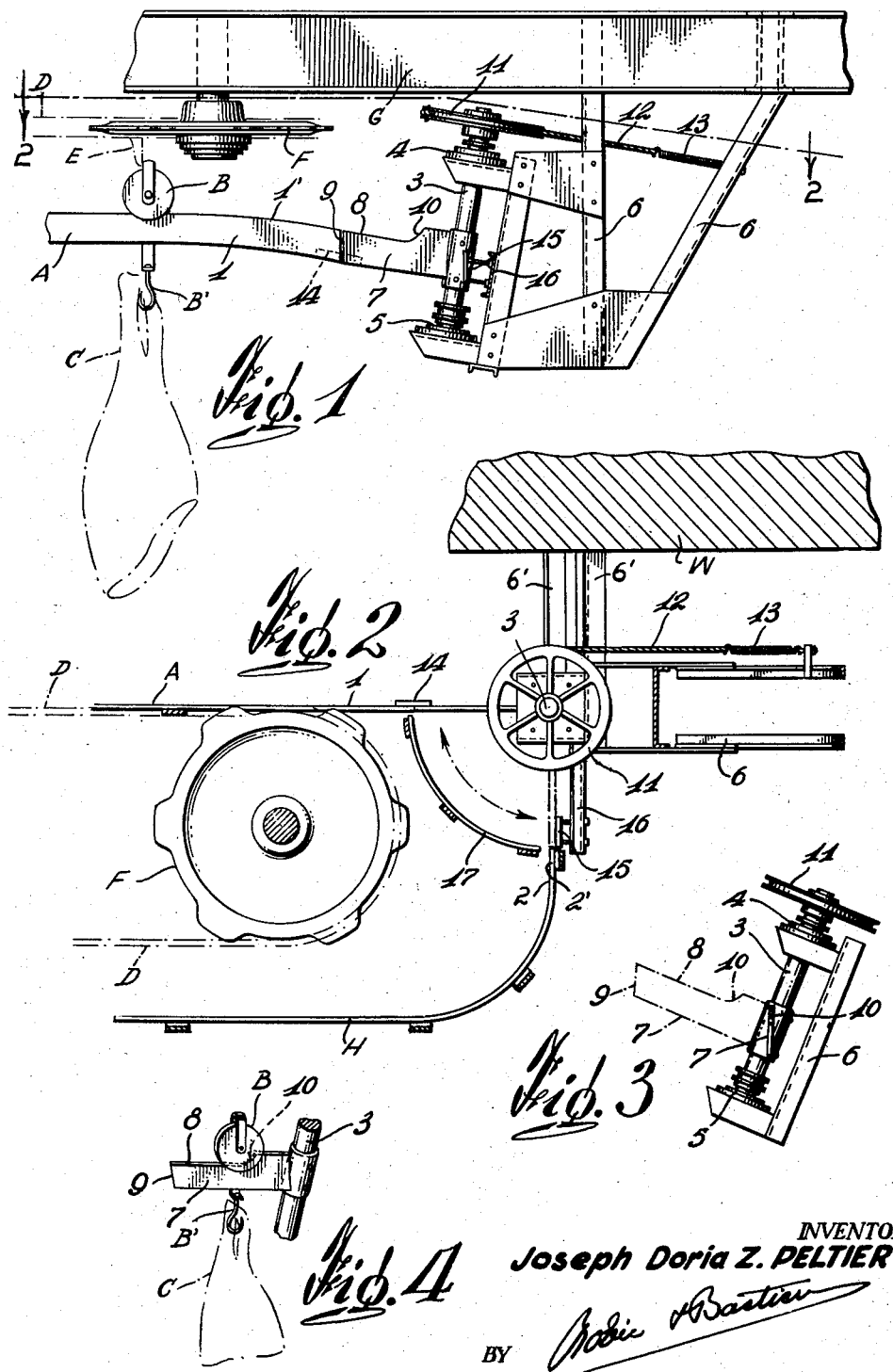
INVENTOR
Joseph Doria Z. PELTIER
BY
ATTORNEYS July 29, 1958  J. D. Z. PELTIER  2,845,035
SWING SWITCH Filed Jan. 11, 1956  2 Sheets-Sheet 2

INVENTOR
Joseph Doria Z. PELTIER
BY
ATTORNEYS

United States Patent Office 2,845,035
Patented July 29, 1958

2,845,035

SWING SWITCH

Joseph Doria Z. Peltier, L'Assomption, Quebec, Canada

Application January 11, 1956, Serial No. 558,538

11 Claims. (Cl. 104—103)

The present invention relates to a swing switch arrangement for an overhead tracking system more particularly adapted for use in the meat processing industry and has for its main object an arrangement which is so designed as to switch from one rail to another the animal carcasses moving on the tracks or rails in such a manner that the switching movement is effected automatically and such as to reverse the directional position of the carcasses relative to their direction of movement along the rails during said switching movement.

Another important object of the present invention is the provision of a swing switch arrangement of the character described which is actuated entirely by gravity in particular by the weight of the animal carcasses moving on the rails.

Another important object of the present invention is the provision of a swing switch arrangement of the character described which may be used in conjunction with rails meeting at any angle.

Yet another object of the present invention is the provision of a swing switch which is simple in construction and will give long and trouble-free service.

The foregoing and other important objects of the present invention will become more apparent during the following disclosure and by referring to the drawings in which:

Figure 1 is a side elevation of the switching arrangement according to the present invention;

Figure 2 is a plan section of the same taken along line 2—2 of Figure 1;

Figure 3 is an elevation of the switch axle and arm;

Figure 4 is a partial perspective view of the elements of Figure 3; and

Figure 5:
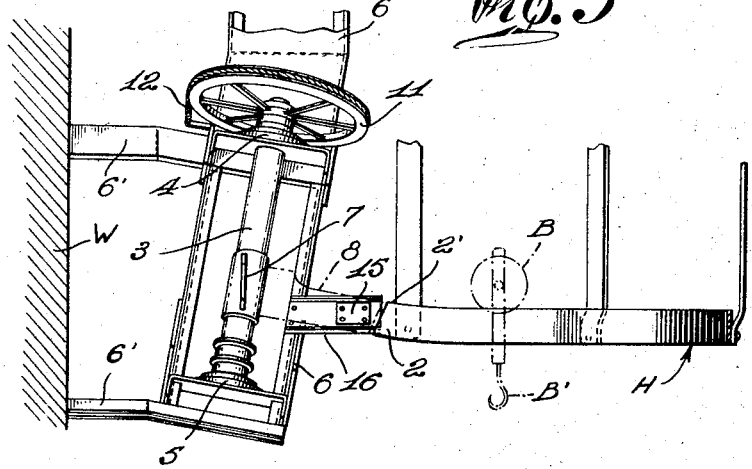
Figure 5 is a front elevation of the switching arrangement taken at right angles to Figure 1.

Referring now more particularly to the drawings in which like reference characters indicate like elements throughout, the reference character A indicates a substantially horizontal ingoing rail which is suspended by suitable means (not shown) from a beam such as the beam G, and on which are movably mounted a plurality of trolley wheels B, each having a hook B' for suspending an animal carcass C. The trolley wheels B are positively moved at spaced intervals along the rail A by means of an endless belt D which is provided with spaced fingers E engageable with the trolley wheels B. The endless belt D is trained on sprocket wheels F, at least one of which is positively moved by suitable driving means (not shown). Each wheel F is mounted on a vertical axle which may be made dependent from the beam G.

The object of the present invention is the provision of means for switching the trolley wheels B and suspended animal carcasses C from the ingoing rail to an outgoing rail, generally indicated at H, and which is shown in Figures 2 and 5. Said outgoing rail H is preferably a return rail for returning the carcasses along a path substantially parallel to the path travelled thereby on the ingoing rail A. The switching arrangement, according to the present invention, is such as to reverse the position of each trolley wheel B and animal carcass C while switching from rail A to rail H so that the animal carcasses will have the same position on the outgoing rail as on the ingoing rail relative to the processors of the animals.

In the embodiment illustrated, the terminal portion 1 of rail A makes a 90° angle with the terminal portion 2 of rail H. The ends of said terminal portions are spaced from each other and if said terminal portions 1 and 2 were extended, their upper edges 1' and 2' would meet at a common point through which passes the axis of a shaft 3.

The upper edge 1' of the terminal portion 1 is downwardly inclined in a direction towards said shaft 3, while the upper edge 2' of the terminal portion 2 of the rail H is downwardly inclined from its end in a direction away from the shaft 3.

The shaft 3 is inclined with respect to the vertical such as to be perpendicular to the upper edge 1' of the terminal portion 1 of rail A and also to the upper edge 2' of the terminal portion 2 of the second rail H. The shaft 3 is rotatably journalled in bearings 4 and 5 which are mounted on a framework 6 suspended from and rigidly secured to the beam G and secured to a wall W by braces 6'.

An arm or rail length 7 is rigidly secured to the shaft 3 intermediate the bearings 4 and 5. The upper edge 8 of the rail length or arm 7 is normal to the shaft 3 and the theoretical inward extension of edge 8 towards said shaft 3 would pass through the common point, above mentioned, which is the meeting point of the theoretical extensions of the upper edges 1' and 2' of the terminal portions 1 and 2 respectively. Therefore, it will be understood that the rail length 7 effects, upon rotation of the shaft 3, a rotatable or swinging movement between a first position in which the upper edge 8 of said rail length 7 is aligned with the upper edge 1' of the terminal portion 1, and a second position in which said upper edge 8 of the rail length is aligned with the upper edge 2' of the terminal portion 2.

In the first position of the rail length 7, its upper edge 8 will be upwardly inclined towards the free end 9 of said rail length 7, while in the second position of said rail length 7 its upper edge 8 will be downwardly inclined towards its free end 9.

Referring to Figures 3 and 4, it will also be noted that the rail length 7 is disposed in a plane which makes an acute angle with the axis of the shaft 3, said angle being equal to the vertical inclination of the shaft 3 in a plane containing the terminal portion 2 of the rail H. Thus when the rail length 7 is in its first position not only its upper edge 1' will be aligned with the upper edge 1' of the terminal portion 1, but said rail length 7 will also lie in a vertical plane passing through the vertical plane containing the terminal portion 1. Similarly, in the second position of the rail length 7, the latter will also lie in a vertical plane, as shown in Figure 3, which will be the same as the vertical plane containing the terminal portion 2 of the outgoing rail H.

It will also be noted that the ends of the terminal portions 1 and 2 are equally spaced from the above mentioned common meeting point of their theoretical extensions and that the rail length 7 has such a length that its free end 9 will be closely adjacent to the ends of the terminal portions 1 and 2 in the first and second positions of said rail length 7 respectively.

As each wheel and hook unit B is released from the finger E at the sprocket wheel F, it will engage the downwardly inclined terminal portion 1 of the ingoing rail A whereby it will continue to travel by gravity and will run over the arm 7 until it abuts the upwardly inclined edge 10 of said arm 7. Because the shaft 3 is vertically inclined in a plane perpendicular to the rail A, the arm 7, under the weight of the animal carcass C, will pivot from its first position in alignment with the rail A to its second position in alignment with the terminal part 2 of the outgoing rail H. In this position the upper edge 8 of the arm 7 will be downwardly inclined towards its free end 9 and, therefore, the wheel and hook unit B and animal carcass C will be automatically discharged under their own gravity onto the outgoing rail H. The unit B will continue to travel on the outgoing rail H and will be discharged at the end of said rail if the latter is downwardly inclined throughout its length, or the unit B will be positively engaged by a system such as the belt D and fingers E as described in relation with the rail A.

It will be understood that the swing switch, according to the present invention, reverses the relative position of the animal carcasses C with respect to the direction of movement of said carcasses along the rails. Thus, if an animal hung by a hind leg is moving with the head in the foremost position along the rail A, this will be reversed and the animal will move with the head in the rearmost position along the return path constituted by the outgoing rail H; thus the animals will maintain their original position relative to the processors.

To automatically return the arm 7 to its first position in alignment with the terminal portion 1 of the ingoing rail A, after it has discharged a wheel and hook unit B onto the outgoing rail H, the shaft 3 is provided with a sheave 11 at its upper end, and a cable 12 is trained on and secured at one end to the periphery of said sheave 11, while the other end of said cable 12 is connected to a spring 13 attached to the frame work 6. Thus upon swinging movement of the shaft 3 and arm or rail length 7, from the first to the second position of said arm 7, the spring 13 is stressed and urges return movement of the shaft 3 to the first position of the arm 7.

In the first position of the arm 7, the free end of the same abuts against a stop 14 which is secured to the terminal part 1 of the rail A and projects therefrom, and in the second position of the arm 7 the latter abuts against an adjustable stop 15 which may be adjusted and which is mounted on an extension 16 secured to the frame work 6.

In order to prevent disengagement of the trolley wheels B from the arm 7 through centrifugal force, upon swinging movement of said arm 7, a circular swing guard 17 is disposed between the terminal ends of the rails A and H in proximity with the free end 9 of the arm 7 at all the pivotal positions of the latter.

In the embodiment described and illustrated the terminal portions of the rails of A and H make a 90° angle between each other. But it will be understood that the same switch arrangement could be associated with rails, the terminal portions of which make an angle different from 90°. Actually the swing switch could be adapted for rails making angles of up to 180°. But in each case the vertical inclination of the shaft 3 and the inclination of the rail length or arm 7 with respect to the shaft 3 will have to be modified accordingly.

While a preferred embodiment according to the present invention has been illustrated and described it is understood that various modifications may be resorted to without departing from the spirit and scope of the appended claims.

I claim:

1. An automatic carcass turning device for an overhead trolley system for use in a slaughtering house, comprising, in combination, a swingable rail length adapted to communicate in a first position with an ingoing rail leading into said rail length and, in a second position, with an outgoing rail leading away from said rail length, a stationary overhead structure, a vertically inclined shaft rotatably journalled in said overhead structure, said rail length being secured to said shaft and having its upper edge substantially perpendicular to the axis of said shaft, the terminal part of said ingoing rail being downwardly inclined towards said shaft and the terminal part of said outgoing rail being downwardly inclined in a direction away from said shaft, the theoretical extensions of the upper edges of said terminal parts meeting at a common point on the axis of said shaft, the inclination of said shaft being such that said shaft is at right angles to the upper edges of said terminal parts of said ingoing and outgoing rails, resilient means normally urging said rail length intto said first position in communication with said ingoing rail for thereby receiving a trolley loaded with a meat cut and rolling under gravity on the terminal part of said ingoing rail onto the rail length in said first position of said rail length, said rail length, under the weight of said trolley and meat cut and due to the vertical inclination of said shaft, being caused to swing to said second position in alignment with said outgoing rail in which second position said rail length is downwardly inclined towards its outer end and thereby discharges said trolley onto said terminal part of said outgoing rail.

2. An automatic carcass turning device as claimed in claim 1 wherein said resilient means comprises a spring attached to said overhead structure at one end and connected to a wheel secured to said shaft at its other end.

3. A switching arrangement for an overhead tracking system comprising an ingoing rail, an outgoing rail and a pivotally mounted rail length each having an upper edge for receiving trolleys in rolling engagement, the terminal adjacent parts of said ingoing and outgoing rails being spaced from and making an angle with each other, said rail length having its pivotal axis vertically inclined downwardly toward said ingoing rail and downwardly away from said outgoing rail for swinging movement between a first position in alignment with the terminal part of said ingoing rail and a second position in alignment with the terminal part of said outgoing rail, the upper edge of the terminal part of said ingoing rail being downwardly inclined towards said rail length and the upper edge of the terminal part of said outgoing rail being downwardly inclined in a direction away form said rail length, the upper edge of said rail length being inclined to said axis at an angle larger than the complement of the smaller angle of inclination of said axis, so that said upper edge of said rail length will change its inclination when moving between said first and second positions, said upper edge of said rail length having in said first position an inclination generally corresponding to the inclination of the terminal part of said ingoing rail and in said second position an inclination generally corresponding to the inclination of the terminal part of said outgoing rail.

4. A switching arrangement as claimed in claim 3 further including resilient means urging said rail length from said second into said first position.

5. A switching arrangement for an overhead track system comprising an ingoing rail, an outgoing rail and a rail length, each having an upper edge for receiving trolleys in rolling engagement, the terminal adjacent parts of said ingoing and outgoing rails being spaced from and making an angle with each other, a rotatably mounted shaft to which said rail length is rigidly secured for swinging movement between a first position in alignment with the terminal part of said ingoing rail and a second position in alignment with the terminal part of said outgoing rail, the upper edge of the terminal of said ingoing rail being downwardly inclined towards said rail length and the upper edge of the terminal part of said outgoing rail being downwardly inclined in a direction away from said rail length, and the longitudinal axis of said shaft being vertically inclined downwardly towards said ingoing rail and downwardly away from said outgoing rail, the upper edge of said rail length being inclined to said axis at an angle larger than the complement of the smaller angle of inclination of said axis so that the upper edge of said rail length will change its inclination when moving between said first and second position, said upper edge of said rail length in said first position having an inclination generally corresponding to the inclination of the terminal part of said ingoing rail and in said second position having an inclination generally corresponding to the inclination of the terminal part of the outgoing rail.

6. A switching arrangement as claimed in claim 5 wherein said rail length has its upper edge substantially at right angles to the axis of said shaft.

7. A switching arrangement as claimed in claim 5, wherein said rail length is disposed in a vertical plane.

8. A switching arrangement as claimed in claim 5, further including resilient means urging said shaft to return said rail length from said second to said first position.

9. A switching arrangement as claimed in claim 5, further including a circular guide disposed between the ends of said ingoing and outgoing rails and in proximity with the free end of said rail length in all the pivotal positions thereof.

10. In a switching arrangement comprising an ingoing rail and an outgoing rail having spaced terminal portions and making an angle with each other, the ingoing rail being positioned at a level higher than the outgoing rail; a pivotally mounted rail length having its pivotal axis generally disposed at the meeting point of the theoretical extensions of said ingoing and outgoing rails, and vertically inclined downwardly towards said ingoing rail and downwardly away from said outgoing rail said rail length having an operative edge, and being mounted with said edge in a substantially horizontal plane intermediate the levels of said ingoing and outgoing rails when it is in an angular position intermediate the angular positions of said rails, whereby the operative edge of said rail length assumes a position upwardly inclined from the horizontal when it is generally aligned with said ingoing rail and a position downwardly inclined from the horizontal when it is generally aligned with said outgoing rail.

11. In a switching arrangement comprising an ingoing rail and an outgoing rail having spaced terminal portions and making an angle with each other, the ingoing rail being positioned at a level higher than the outgoing rail; a pivotally mounted rail length having an operative edge which meets a vertical line meeting the theoretical extensions of said ingoing and outgoing rails, in a point of said vertical line which is at the mean level of said ingoing and outgoing rails, said rail length having its pivotal axis passing through said point, said axis being downwardly inclined towards said ingoing rail and away from said outgoing rail at angles from the vertical not greater than the angle defined by a horizontal plane passing through the terminal portion of either rail and a line passing through said terminal portion of either rail and said mean level point, the operative edge of said rail length being perpendicular to said axis, whereby the operative edge of said rail length assumes a position upwardly inclined from the horizontal when it is aligned with said ingoing rail and a position downwardly inclined from the horizontal when it is aligned with said outgoing rail.

References Cited in the file of this patent

UNITED STATES PATENTS

| | | |
|---|---|---|
| 744,629 | Schmidt et al. | Nov. 17, 1903 |
| 2,383,835 | Ackermann | Aug. 28, 1945 |
| 2,407,620 | Vinsant | Sept. 10, 1946 |
| 2,657,643 | Swanback et al. | Nov. 3, 1953 |
| 2,746,397 | Le Fiell | May 22, 1956 |

FOREIGN PATENTS

| | | |
|---|---|---|
| 116,744 | Germany | Jan. 5, 1901 |
| 117,448 | Germany | Feb. 6, 1906 |
| 1,820 | Great Britain | Apr. 1, 1899 |